United States Patent
Grzenda et al.

[11] Patent Number: 5,923,826
[45] Date of Patent: Jul. 13, 1999

[54] COPIER/PRINTER WITH PRINT QUEUE DISPOSED REMOTELY THEREOF

[75] Inventors: Marilyn S. Grzenda, Fairport; Holly S. Beck, Canandaigua; Stephen F. Skrainar, Penfield; John W. Daughton, Rochester; David L. Salgado, Victor; Cynthia A. Smith, Rochester, all of N.Y.

[73] Assignee: Xerox Corporation, Stamford, Conn.

[21] Appl. No.: 08/786,466

[22] Filed: Jan. 21, 1997

[51] Int. Cl.[6] ................................... G06F 13/00
[52] U.S. Cl. .................. 395/114; 395/115; 358/404; 358/444; 710/54; 710/15; 710/17; 710/18; 379/100.01
[58] Field of Search .................... 395/114, 115, 395/200.3, 200.31, 200.47, 200.49; 710/15, 17, 18–19, 39, 54; 358/468, 471, 444, 404; 379/100.01

[56] References Cited

U.S. PATENT DOCUMENTS

| | | | |
|---|---|---|---|
| 4,163,124 | 7/1979 | Jolissaint | 179/18 D |
| 5,113,494 | 5/1992 | Menendez et al. | 395/163 |
| 5,179,637 | 1/1993 | Nardozzi | 395/114 |
| 5,220,674 | 6/1993 | Morgan et al. | 395/800 |
| 5,327,526 | 7/1994 | Nomura et al. | 395/115 |
| 5,699,495 | 12/1997 | Snipp | 395/114 |
| 5,768,483 | 6/1998 | Maniwa et al. | 395/114 |

Primary Examiner—Scott Rogers
Assistant Examiner—Lance W. Sealey
Attorney, Agent, or Firm—Gary B. Cohen

[57] ABSTRACT

A printing system with a digital reproduction system communicating with a remote document processing station by way of a print server is provided. The printing system includes a first queue of first jobs to be executed with the digital reproduction system maintained at the print server and a second queue of second jobs to be executed with the digital reproduction system maintained at the digital reproduction system. The printing system further includes a queue process communicating with both the first and second queues for forming a composite queue to reflect an order in which the first and second jobs of the first queue and the second queues are to be executed with the digital reproduction system. In practice, the composite queue is formed by initiating development of the composite queue in response to a request signal with the request signal being generated on the basis of input from the remote document processing station, automatically, electronically obtaining a first set of information reflecting an order of the first jobs in the first queue and a second set of information reflecting an order of the second jobs in the second queue, and merging the first set of information with the second set of information in accordance with a selected criterion for providing the composite queue. A representation of the composite queue is then displayed at a user interface disposed at the remote document processing station.

27 Claims, 9 Drawing Sheets

COPIER/PRINTER WITH PRINT QUEUE DISPOSED REMOTELY THEREOF

BACKGROUND

This invention relates generally to a printing system having a document processing station communicating with a document reproduction system by way of a print server and, more particularly, to system for generating a print queue at the document processing station based on jobs "seen" at both the print server and the document reproduction system. Desirably, a queue operation, based on input from the document processing station, is performable on the generated print queue.

Electronic printing systems typically include an input section, sometimes referred to as an input image terminal ("IIT"), a controller, sometimes referred to as an electronic subsystem ("ESS") and an output section or print engine, sometimes referred to as an image output terminal ("IOT"). In one type of electronic printing system, manufactured by Xerox® Corporation, known as the DocuTech® electronic printing system, a job can be inputted to the printing system from, among other sources, a network or a scanner. An example of a printing system with both network and scanner inputs is found in the following patent:

U.S. Pat. No. 5,170,340

Patentees: Prokop et al.

Issued: Dec. 8, 1992

When a scanner is employed to generate the job, image bearing documents are scanned so that the images therein are converted to image data for use in making prints. When a network is used to generate the job, a stream of data, including various job related instructions and image data, expressed in terms of a page description language is captured, decomposed and stored for printing. As is known, a network job can have its origin in a remote client, such as a workstation, or a print server with a storage device. Jobs provided at the IIT may be stored in a memory section, sometimes referred to as "electronic precollation memory". An example of electronic precollation memory may be found in the following patent:

U.S. Pat. No. 5,047,955

Patentees: Shope et al.

Issued: Sep. 10,1991

U.S. Pat. No. 5,047,955 discloses a system in which input image data of a job is rasterized and compressed. The compressed, rasterized image data is then stored, in collated form, in a job image buffer. Once the job has been stored in the job image buffer, a selected number of job copies can be decompressed and printed without further job rasterization.

In one area related to electronic printing, namely digital copying, a demand for "multifunctionality" continues to grow. As illustrated by the following patent, a multifunctional digital copier can assume the form of an arrangement in which a single electrostatic processing printer is coupled with a plurality of different image input devices, with such devices being adapted to produce image related information for use by the printer.

U.S. Pat. No. 3,957,071

Patentee: Jones

Issued: Jul. 27, 1971

U.S. Pat. No. 3,957,071 discloses that the image related information, in one example, could have its origin in video facsimile signals, microfilm, data processing information, light scanning platens for full size documents, aperture cards and microfiche.

The following patents also relate to the area of multifunctional digital copying:

U.S. Pat. No. 4,821,107

Patentees: Naito et al.

Issued: Apr. 11, 1989

U.S. Pat. No. 5,021,892

Patentees: Kita et al.

Issued: Jun. 4, 1991

U.S. Pat. No. 5,175,633

Patentees: Saito et al.

Issued: Dec. 29, 1992

U.S. Pat. No. 5,223,948

Patentees: Sakurai et al.

Issued: Jun. 29, 1993

U.S. Pat. No. 5,276,799

Patentee: Rivshin

Jan. 4, 1994

U.S. Pat. No. 5,307,458

Patentees: Freiburg et al.

Issued: Apr. 26, 1994

Multifunctional copying devices are typically adapted to store a plurality of jobs for eventual printing. In one example, jobs are ordered for printing in an arrangement referred to as a "print queue". Xerox Network Systems have employed the concept of the print queue for at least a decade to manage jobs at network printers. Further teaching regarding network printing is provided in the following patent:

U.S. Pat. No. 5,436,730

Patentee: Hube

Issued: Jul. 25, 1995

The concept of a print queue is integral to operation of Xerox' DocuTech Printing System as exemplified in the following patent:

U.S. Pat. No. 5,164,842

Patentees: Gauronski et al.

Issued: Nov. 17, 1992

A print queue particularly well suited for use with a multifunctional printing system is disclosed by the following patent:

U.S. Pat. No. 4,947,345

Patentees: Paradise et al.

Issued: Aug. 7, 1990

It has been found that a typical digital copier is particularly well suited for use with a network printing arrangement in which the digital copier is interfaced with a client (e.g. workstation) by way of a suitable network connection and a print server. The following patents represent examples of servers suitable for use with printing systems:

U.S. Pat. No. 5,113,494

Patentees: Menendez et al.

Issued: May 12, 1992

U.S. Pat. No. 5,179,637

Patentee: Nardozzi

Issued: Jan. 12, 1993

U.S. Pat. No. 5,220,674

Patentees: Morgan et al.

Issued: Jun. 15, 1993

U.S. Pat. No. 5,113,494 discloses an arrangement in which a plurality of nodes communicate with one another by way of a local area network communication line. In one example, a hardcopy of a job could be processed at a scan node while an electronic copy of the same job could be processed at a print node.

U.S. Pat. No. 5,179,637 discloses a system for distributing print jobs received from a print image data source among a set of print engines and associated processors. One or more data files containing the information required to print one or more copies of an image are submitted to a scheduler and the scheduler interprets the job control information in the data file(s) for the image and passes the data files(s) to an image processor.

U.S. Pat. No. 5,220,674 discloses a local area print server which functions in cooperation with a plurality of clients and a plurality of printers to facilitate communication between the clients and the printers. The server includes various subsystems, such as a status collection subsystem that maintains a wide range of state information regarding virtually every subsystem with which the server communicates. The status collection subsystem includes a notification facility which sends reports of printing system status changes or events to appropriate network components internal and external to the local area print server that would have an interest in knowing them.

In the server of the '674 patent, it is easy to maintain information regarding an order in which jobs are to be printed because each job is generated by a client and submitted to an appropriate printer by way of the server. When a server is used in conjunction with a digital copier, however, the order of job processing is not necessarily known to a remote client because some jobs, e.g. copy jobs developed at the digital copier, are queued up independently of the server. Thus, while a server commonly maintains a queue of print jobs to be executed and those print jobs can be "seen" at the digital copier, the copy jobs are not necessarily seen by the remote client. By way of example, on Xerox' Document Centre 35, the local user can obtain a queue at the copier which accommodates for the existence of jobs out on the server as well as jobs at the copier; however, a remote client on the same system cannot obtain a queue reflective of jobs processed at both the server and the copier. It would be desirable to provide a technique for developing a composite queue in which a client is apprised of the order of printing for jobs originating from both the server and the copier.

The disclosures of each of the references mentioned or discussed in the above Background is incorporated herein by reference.

SUMMARY OF THE INVENTION

In accordance with one aspect of the present invention there is provided a printing system with a digital reproduction system having a print engine. The digital reproduction system communicates with a remote document processing station by way of a print server and includes: (a) a first queue of first jobs to be executed with the digital reproduction system maintained at the print server; (b) a second queue of second jobs to be executed with the digital reproduction system maintained at the digital reproduction system; (c) a queue process communicating with both said first and second queues, said queue process forming a composite queue to reflect an order in which the first and second jobs of the first queue and the second queues are to be executed with the digital reproduction system by, (i) initiating development of said composite queue in response to a request signal, said request signal being generated on the basis of input from the remote document processing station; (ii) automatically, electronically obtaining a first set of information reflecting an order of the first jobs in the first queue and a second set of information reflecting an order of the second jobs in the second queue; (iii) merging the first set of information with the second set of information in accordance with a selected criterion for providing the composite queue; and (d) a user interface disposed at the remote document processing station, said user interface receiving a representation of said composite queue for display thereof.

In accordance with another aspect of the present invention there is provided a printing system with a digital reproduction system having a print engine. The digital reproduction system communicates with a remote document processing station by way of a print server and includes: (a) a first queue of first jobs to be executed with the digital reproduction system maintained at the print server; (b) a second queue of second jobs to be executed with the digital reproduction system maintained at the digital reproduction system; (c) a queue process communicating with both said first and second queues, said queue process forming a composite queue to reflect an order in which the jobs of both the first queue and the second queue are to be executed with the digital reproduction system; (d) a user interface, disposed at the remote document processing station, for (i) selecting one of the jobs in the composite queue, and (ii) designating a queue operation to be performed on said selected job; and (e) a queue operation subsystem for performing said queue operation on said selected job in response to both input from said user interface and a selected condition being met.

DESCRIPTION OF THE INVENTION

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
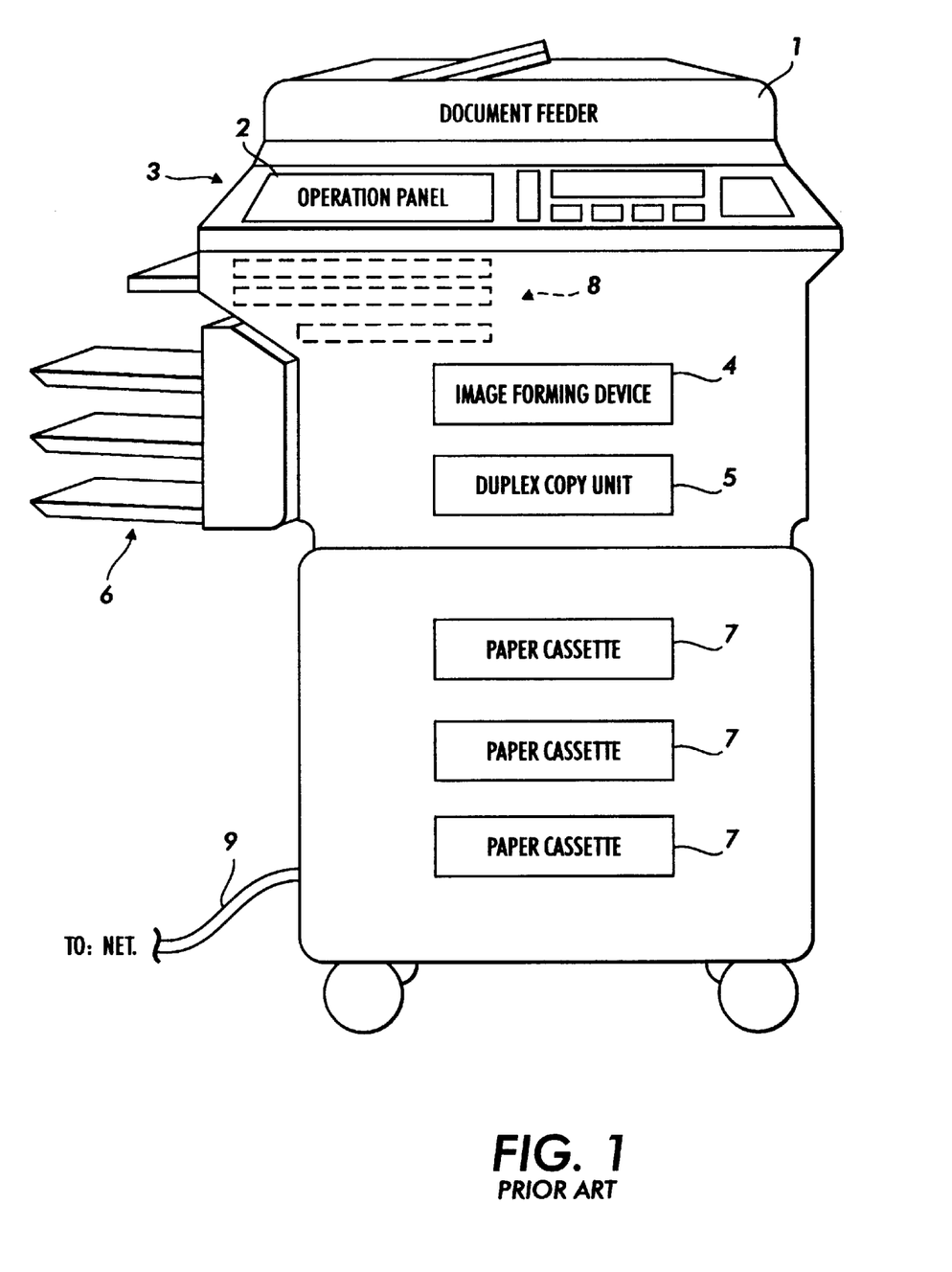
FIG. 1 is a perspective view of a networked digital copier suitable for receiving a job developed in accordance with the present invention.

Referring to FIG. 1 of the drawings, a digital copier system of the type suitable for use with the preferred embodiment is shown. As shown, the system includes a document feeder 1 and an operation (and display) panel 2. After desired conditions have been entered on the operation panel 2, the document feeder 1 conveys a document to a predetermined reading position on an image reading device 3 and, after the document has been read, drives it away from the reading position. The image reading device 3 illuminates the document brought to the reading position thereof. The resulting reflection from the document is transformed to a corresponding electric signal, or image signal, by a solid state imaging device, e.g., a CCD (Charge Coupled Device) image sensor. An image forming device 4 forms an image represented by the image signal on a plain paper or a thermosensitive paper by an electrophotographic, thermosensitive, heat transfer, ink jet or similar conventional system.

As a paper is fed from any one of paper cassettes 7 to the image on forming device 4, the device 4 forms an image on one side of the paper. A duplex copy unit 5 is constructed to turn over the paper carrying the image on one side thereof and again feed it to the image forming device 4. As a result, an image is formed on the other side of the paper to complete a duplex copy. The duplex copy unit 5 has customarily been designed to refeed the paper immediately or to sequentially refeed a plurality of papers stacked one upon the other, from the bottom paper to the top paper. The papers, or duplex copies, driven out of the image forming device 4 are sequentially sorted by a output device 6 in order of page or page by page.

Applications, generally 8, share the document feeder 1, operation panel 2, image reading device 3, image forming device 4, duplex unit 5, output device 6, and paper cassettes 7 which are the resources built in the copier system. As will appear, the applications include a copier application, a printer (IOT) application, a facsimile (Fax) application and other applications. Additionally, the digital copier system is coupled with a network by way of a conventional network connection 9.

Figure 2:
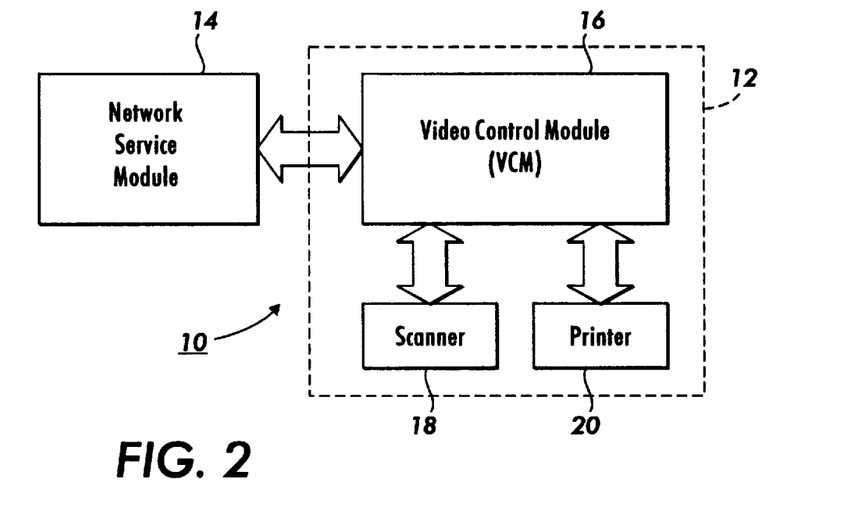
FIG. 2 is a block diagram depicting a multifunctional, network adaptive printing machine.

Referring to FIG. 2, a multifunctional, network adaptive printing system is designated by the numeral 10. The printing system 10 includes a printing machine 12 operatively coupled with a network service module 14. The printing machine 12 includes an electronic subsystem 16, referred to as a video control module (VCM), communicating with a scanner 18 and a printer 20. In one example, the VCM 16, which will be described in further detail below, coordinates the operation of the scanner and printer in a digital copying arrangement. In a digital copying arrangement, the scanner 18 (also referred to as image input terminal (IIT)) reads an image on an original document by using a CCD full width array and converts analog video signals, as gathered, into digital signals. In turn, an image processing system 22 (FIG. 3), associated with the scanner 18, executes signal correction and the like, converts the corrected signals into multi-level signals (e.g. binary signals), compresses the multi-level signals and preferably stores the same in electronic precollation (EPC) memory 24.

Referring again to FIG. 2, the printer 20 (also referred to as image output terminal (IOT)) preferably includes a xerographic print engine. In one example, the print engine has a multi-pitch belt (not shown) which is written on with an imaging source, such as a synchronous source (e.g. laser raster output scanning device) or an asynchronous source (e.g. LED print bar). In a printing context, the multi-level image data is read out of the EPC memory 24 (FIG. 3) while the imaging source is turned on and off, in accordance with the image data, forming a latent image on the photoreceptor. In turn, the latent image is developed with, for example, a hybrid jumping development technique and transferred to a print media sheet. Upon fusing the resulting print, it may be inverted for duplexing or simply outputted. It will be appreciated by those skilled in the art that the printer can assume other forms besides a xerographic print engine without altering the concept upon which the disclosed embodiment is based. For example, the printing system 10 could be implemented with a thermal ink jet or ionographic printer.

Figure 3:
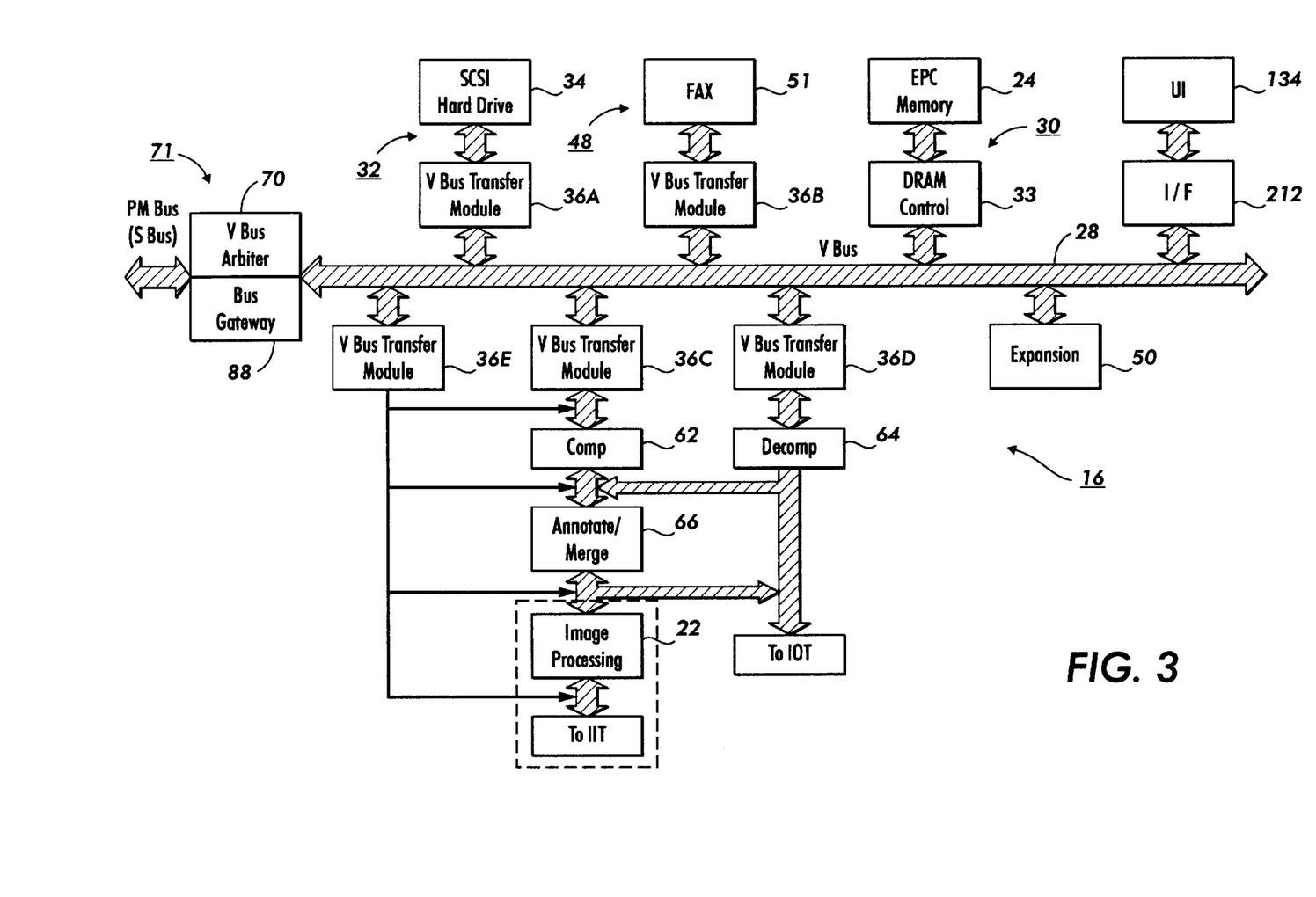
FIG. 3 is a block diagram of a video control module for the printing machine of FIG. 2.

Referring specifically to FIG. 3, the VCM 16 is discussed in further detail. The VCM 16 includes a video bus (VBus) 28 with which various I/O, data transfer and storage components communicate. Preferably, the VBus is a high speed, 32 bit data burst transfer bus which is expandable to 64 bit. The 32 bit implementation has a sustainable maximum bandwidth of approximately 60 MBytes/sec. In one example, the bandwidth of the VBus is as high as 100 Mbytes/sec.

The storage components of the VCM reside in the EPC memory section 30 and the mass memory section 32. The EPC memory section includes the EPC memory 24, the EPC memory being coupled with the VBus by way of a DRAM controller 33. The EPC memory, which is preferably DRAM, provides expansion of up to 64 MBytes, by way of two high density 32 bit SIMM modules. The mass memory section 32 includes a SCSI hard drive device 34 coupled to the VBus by way of a transfer module 36a. As will appear, other I/O and processing components are coupled respectively to the VBus by way of transfer modules 36. It will be appreciated that other devices (e.g. a workstation) could be coupled to the VBus by way of the transfer module 36a through use of a suitable interface and a SCSI line.

Figure 4:
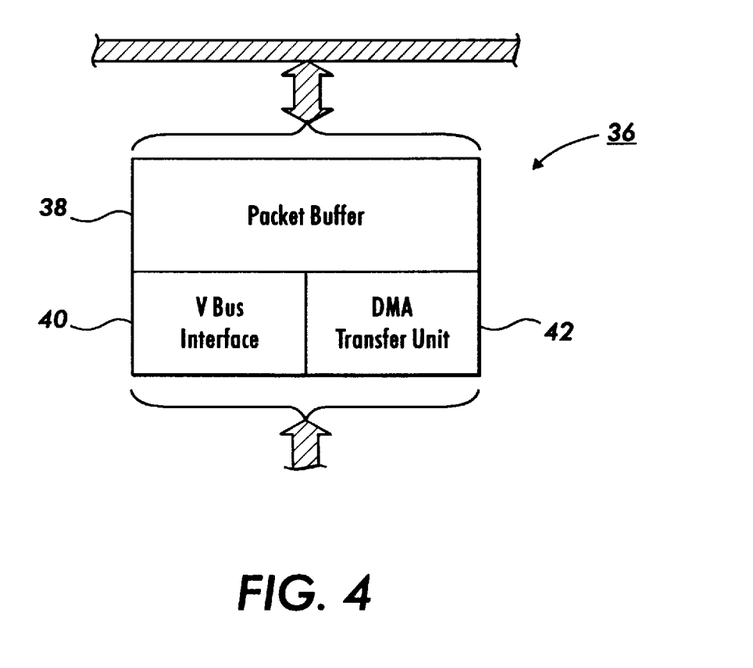
FIG. 4 is a block diagram of a transfer module used in conjunction with the printing machine of FIG. 3.

Referring to FIG. 4, the structure of one of the transfer modules 36 is discussed in further detail. The illustrated transfer module of FIG. 4 includes a packet buffer 38, a VBus interface 40 and DMA transfer unit 42. The transfer module 36, which was designed with "VHSIC" Hardware Description Language (VHDL), is a programmable arrangement permitting packets of image data to be transmitted along the VBus at a relatively high transfer rate. In particular, the packet buffer is programmable so that the segment or packet can be varied according to the available bandwidth of the VBus. In one example, the packet buffer can be programmed to handle packets of up to 64 Bytes Preferably, the packet size would be reduced for times when the VBus is relatively busy and increased for times when activity on the bus is relatively low.

Figure 6:
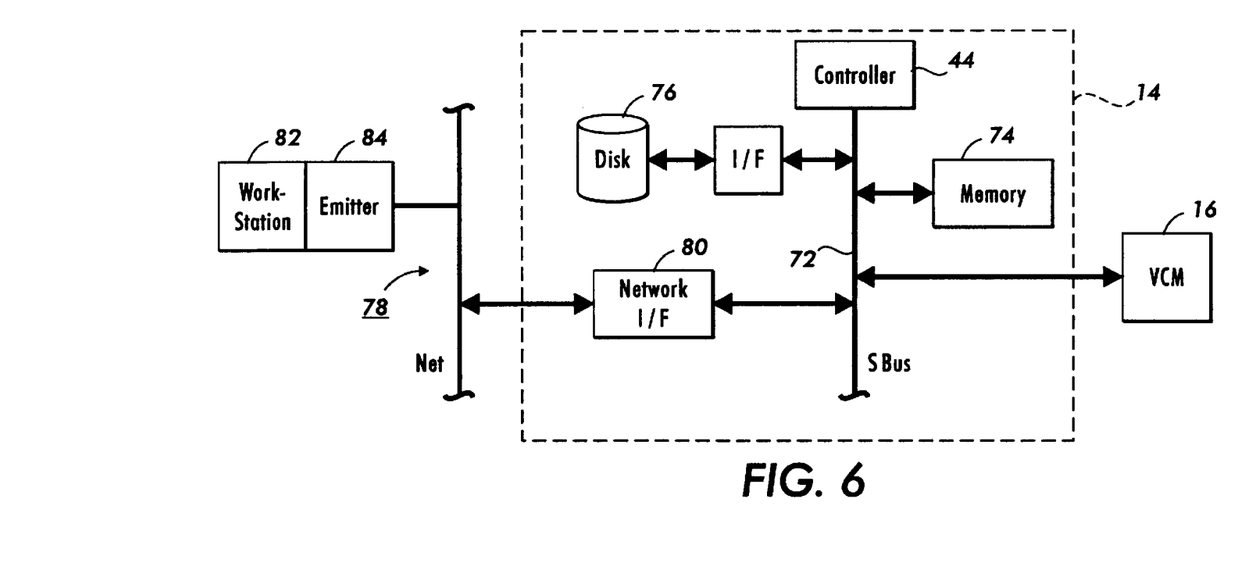
FIG. 6 is a block diagram of a network controller for the printing machine of FIG. 2.

Adjustment of the packet size is achieved with the VBus interface 40 (FIG. 4) and a system controller 44 (FIG. 6). Essentially, the VBus interface is an arrangement of logical components, including, among others, address counters, decoders and state machines, which provides the transfer module with a selected degree of intelligence. The interface 40 communicates with the system controller to keep track of desired packet size and, in turn, this knowledge is used to adjust the packet size of the packet buffer 38, in accordance with bus conditions. That is, the controller, in view of its knowledge regarding conditions on the VBus 28, passes directives to the interface 40 so that the interface can adjust packet size accordingly. Further discussion regarding operation of the transfer module 36 is provided below.

More particularly, image transfer is facilitated with a DMA transfer unit which employs a conventional DMA transfer strategy to transfer the packets. In other words, the beginning and end addresses of the packet are used by the transfer unit in implementing a given transfer. When a transfer is complete, the interface 40 transmits a signal back to the system controller 44 so that further information, such as desired packet size and address designations, can be obtained.

Figure 5:
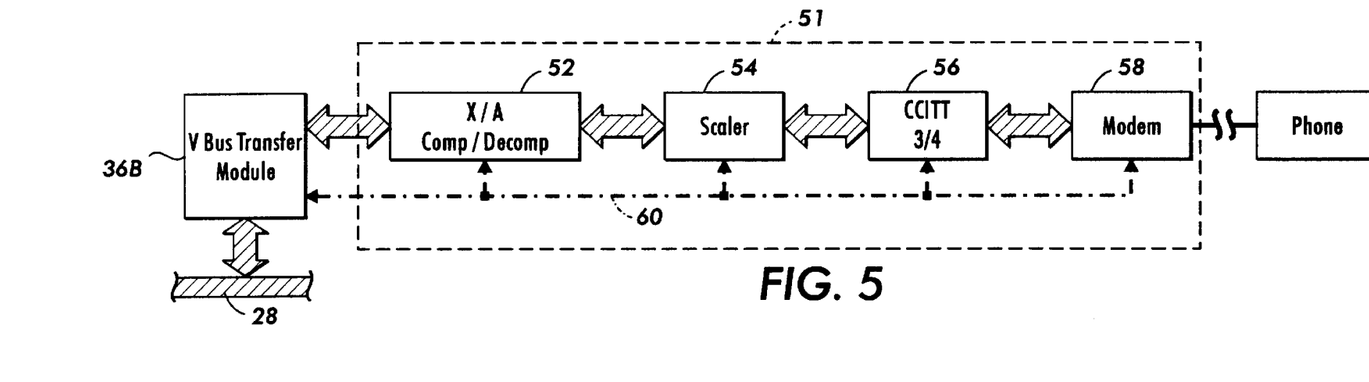
FIG. 5 is a block diagram of a facsimile card used in conjunction with the printing machine of FIG. 3.

Referring to FIGS. 2 and 3, three I/O components are shown as being coupled operatively to the VBus 28, namely a FAX module 48, the scanner or IIT 18, and the printer or IOT 20; however, it should be recognized that a wide variety of components could be coupled to the VBus by way an expansion slot 50. Referring to FIG. 5, an implementation for the FAX module, which is coupled to the VBus 28 by way of transfer module 36b, is discussed in further detail. In the preferred embodiment, a facsimile device (FAX) 51 includes a chain of components, namely a section 52 for performing Xerox adaptive compression/decompression, a section 54 for scaling compressed image data, a section 56 for converting compressed image data to or from CCITT format, and a modem 58, preferably manufactured by Rockwell Corporation, for transmitting CCITT formatted data from or to a telephone, by way of a conventional communication line.

Referring still to FIG. 5, each of the sections 52, 54 and 56 as well as modem 58 are coupled with the transfer module 36b by way of a control line 60. This permits transfers to be made to and from the FAX module 48 without involving a processor. As should be understood, the transfer module 36b can serve as a master or slave for the FAX module in that the transfer module can provide image data to the FAX for purposes of transmission or receive an incoming FAX. In operation, the transfer module 36b reacts to the FAX module in the same manner that it would react to any other I/O component. For example, to transmit a FAX job, the transfer module 36b feeds packets to the section 52 through use of the DMA transfer unit 42 and, once a packet is fed, the transfer module transmits an interrupt signal to the system processor 44 requesting another packet. In one embodiment, two packets are maintained in the packet buffer 38 so that "ping-ponging" can occur between the two packets. In this way, the transfer module 36b does not run out of image data even when the controller cannot get back to it immediately upon receiving an interrupt signal.

Referring again to FIG. 3, the IIT 18 and IOT 20 are operatively coupled to the VBus 28 by way of transfer modules 36c and 36d. Additionally, the IIT 18 and the IOT 20 are operatively coupled with a compressor 62 and a decompressor 64, respectively. The compressor and decompressor are preferably provided by way of a single module that employs Xerox adaptive compression devices. Xerox adaptive compression devices have been used for compression/decompression operations by Xerox Corporation in its DocuTech® printing system. In practice, at least some of the functionality of the transfer modules is provided by way of a 3 channel DVMA device, which device provides local arbitration for the compression/decompression module.

As further illustrated by FIG. 3, the scanner 18, which includes the image processing section 22, is coupled with an annotate/merge module 66. Preferably, the image processing section includes one or more dedicated processors programmed to perform various desired functions, such as image enhancement, thresholding/screening, rotation, resolution conversion and TRC adjustment. The selective activation of each of these functions can be coordinated by a group of image processing control registers, the registers being programmed by the system controller 44. Preferably, the functions are arranged along a "pipeline" in which image data is inputted to one end of the pipe, and image processed image data is outputted at the other end of the pipe. To facilitate throughput, transfer module 36e is positioned at one end of the image processing section 22 and transfer module 36c is positioned at another end of the section 22. As will appear, positioning of transfer modules 36c and 36e in this manner greatly facilitates the concurrency of a loopback process.

Referring still to FIG. 3, arbitration of the various bus masters of the VCM 16 is implemented by way of a VBus arbiter 70 disposed in a VBus arbiter/bus gateway 71. The arbiter determines which bus master (e.g. FAX module, Scanner, Printer, SCSI Hard Drive, EPC Memory or Network Service Component) can access the VBus at one given time. The arbiter is made up of two main sections and a third control section. The first section, i.e., the "Hi-Pass" section, receives input bus requests and current priority selection, and outputs a grant corresponding to the highest priority request pending. The current priority selection input is the output from the second section of the arbiter and is referred to as "Priority Select". This section implements priority rotation and selection algorithm. At any given moment, the output of the logic for priority select determines the order in which pending requests will be serviced. The input to Priority Select is a register which holds an initial placement of devices on a priority chain. On servicing requests, this logic moves the devices up and down the priority chain thereby selecting the position of a device's next request. Control logic synchronizes the tasks of the Hi-Pass and the Priority Select by monitoring signals regarding request/grant activity. It also prevents the possibility of race conditions.

Referring to FIG. 6, the network service module 14 is discussed in further detail. As will be recognized by those skilled in the art, the architecture of the network service module is similar to that of a known "PC clone". More particularly, in the preferred embodiment, the controller 44, which preferably assumes the form of a SPARC processor, manufactured by Sun Microsystems, Inc., is coupled with a standard SBus 72. In the illustrated embodiment of FIG. 6, a host memory 74, which preferably assumes the form of DRAM, and a SCSI disk drive device 76 are coupled operatively to the SBus 72. While not shown in FIG. 6, a storage or I/O device could be coupled with the SBus with a suitable interface chip. As further shown in FIG. 6, the SBus is coupled with a network 78 by way of an appropriate network interface 80. In one example, the network interface includes all of the hardware and software necessary to relate the hardware/software components of the controller 44 with the hardware/software components of the network 78. For instance, to interface various protocols between the network service module 14 and the network 78, the network interface could be provided with, among other software, Netware® from Novell Corp.

In one example, the network 78 includes a client, such as a workstation 82 with an emitter or driver 84. In operation, a user may generate a job including a plurality of electronic pages and a set of processing instructions. In turn, the job is converted, with the emitter, into a representation written in a page description language, such as PostScript. The job is then transmitted to the controller 44 where it is interpreted with a decomposer, such as one provided by Adobe Corporation. Some of the principles underlying the concept of interpreting a PDL job are provided in U.S. Pat. No. 5,493,634 to Bonk et al. and U.S. Pat. No. 5,226,112 to Mensing et al., the disclosures of both references being incorporated herein by reference. Further details regarding a technique for generating a job in a PDL may be obtained by reference to the following text, the pertinent portions of which are incorporated herein by reference:

PostScript® Language Reference Manual

Second Edition

Addison-Wesley Publishing Co. 1990

Referring again to FIG. 3, the network service module 14 is coupled with the VCM 16 via a bus gateway 88 of the VBus arbiter/bus gateway 71. In one example, the bus gateway comprises a field programmable gate array provided by XILINX corporation. The bus gateway device provides the interface between the host SBus and the VCM VBus. It provides VBus address translation for accesses to address spaces in the VBus real address range, and passes a virtual address to the host SBus for virtual addresses in the host address range. A DMA channel for memory to memory transfers is also implemented in the bus gateway. Among other things, the bus gateway provides seamless access between the VBus and SBus, and decodes virtual addresses from bus masters, such as one of the transfer modules 36, so that an identifier can be obtained from a corresponding slave component. It will be appreciated by those skilled in the art that many components of the printing system 10 are implemented in the form of a single ASIC.

Referring to FIGS. 3, 4 and 6, further discussion regarding DMA transfer of each of the transfer modules 36 is provided. In particular, in one example, the images of a job are stored in the host memory 74 as a series of blocks. Preferably, each block comprises a plurality of packets. In operation, one of the transfer modules 36 is provided, by the controller 44, with the beginning address of a block and the size of the block. In turn, for that block, the transfer module 36 effects a packet transfer and increments/decrements a counter. This procedure is repeated for each packet of the block until the interface 40 determines, by reference to the counter, that the last packet of the block has been transferred. Typically, for each stored image, several blocks are transferred, in a packet-by-packet manner, as described immediately above.

Figure 7:
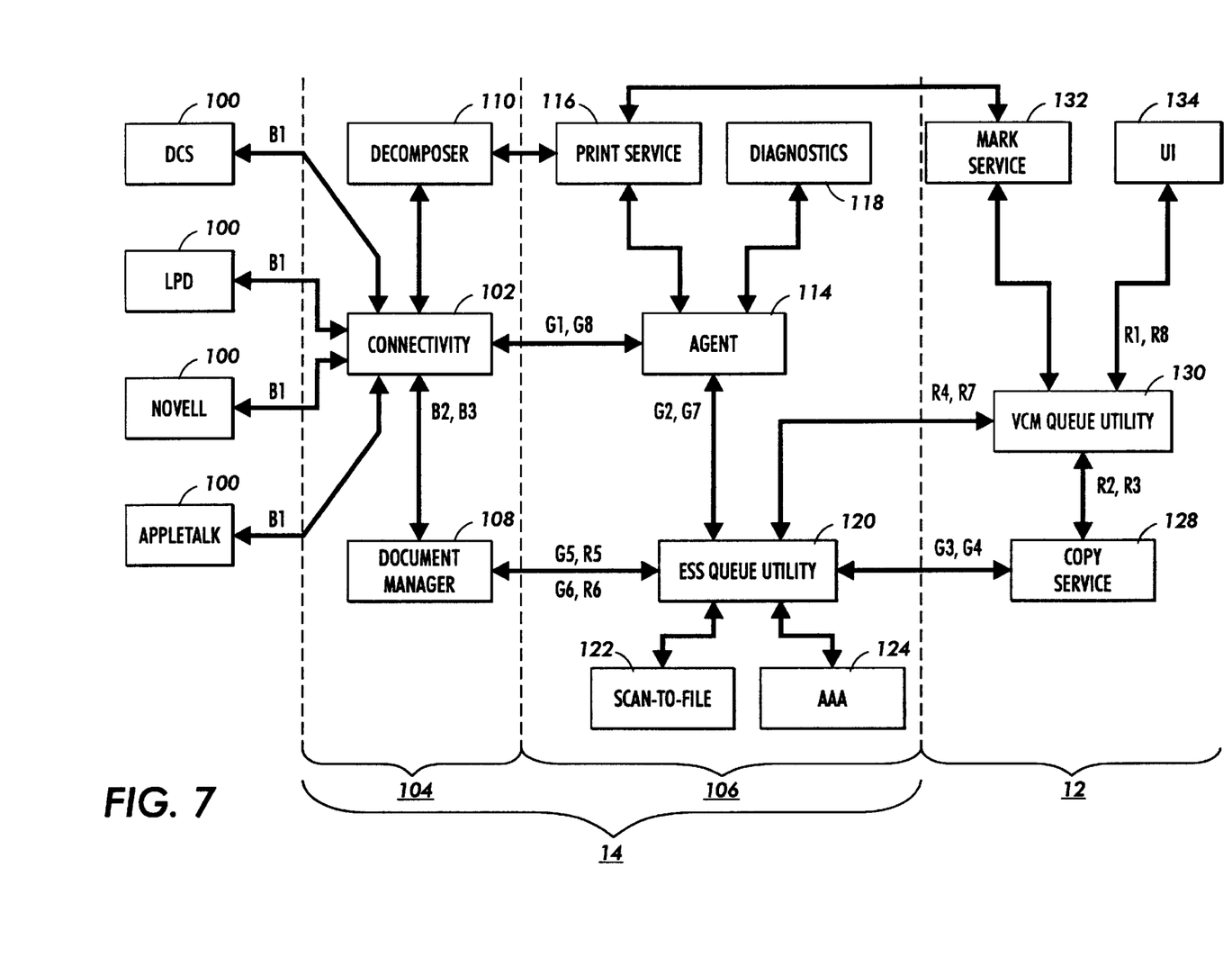
FIG. 7 is a block diagram showing the network controller of FIG. 6 in greater detail.

Referring to FIG. 7, a block diagram which further elaborates on the network controller schematic of FIG. 6 is shown. In the illustrated embodiment of FIG. 7, the clients 100 (each client, in FIG. 6, being shown with a workstation 82 and an emitter 84) are configured with a variety of protocols, such as LPD (a protocol for UNIX), Novell network protocol, AppleTalk and DCS (a protocol for Xerox digital copiers known as the "Document Centre Systems"). The clients communicate with the network server or electronic subsystem ("ESS") 14 by way of Connectivity Services (CS) 102. As shown in FIG. 7, the ESS comprises two parts, namely a Microkernel 104 (more particularly, a partial abstract model of a Microkernel mapped into a model based on DPA ISO 10175/POSIX IEEE 1003.7) and an application specific subsystem 106.

In general, a network or point-to-point print submission originates at the Protocol Services level of the (CS) subsystem. Each Protocol Service listens on a well-known socket for a connection indication. When a Protocol Service receives the connection indication it submits a job request to the Connectivity Core. The Connectivity Core will translate this request into a DPA-compatible format and forward it to a DM subsystem 108. When the job submission is granted, the Protocol Services can submit one or more documents. Document submission is achieved by sending a document request and an I/O descriptor to the Connectivity Core. This will also be translated and forwarded to the DM subsystem.

After the document has been accepted, the Protocol Service starts to receive data from the underlying protocol stack and writes it into the I/O descriptor. This data will read on the other side of the I/O descriptor by a consumer or will be spooled somewhere in the system. When the remote client indicates that there is no more data, the I/O descriptor is closed signaling the end of this specific document. After all documents have been received, a job termination request is sent from the Protocol Services to the Connectivity Core, which then forwards it to the DM. Eventually, this request will be completed by the system, and the Protocol Service will release all resources associated with the job.

The Microkernel has a Document Management (DM) subsystem that performs most of the DPA/POSIX Server functionality. The DM subsystem validates user requests, queues requests, spools document data, schedules the job for the device, and collects and maintains status information. The DM subsystem extends the DPA/POSIX Server in some aspects, since it can be configured to handle scan jobs (for filing or faxing) and copying jobs. DM provides for document sniffing, spooling, and scheduling services. Service providers, such as Document Processing 110 can register their services with DM.

Document Processing (DP), which includes the Image Frame Store (IFS) and the instantiation of at least one producer, is provided with the Microkernel. DP processes documents into images (full frame buffers or raster-scan bands, depending on the configuration of the Microkernel). The Image Frame Store assigns producers to consumers.

Essentially, the Microkernel 104 can be thought of as a generic ESS while the subsystem 106 can be thought of as an application specific ESS. That is, the Microkernel 104 contains the fundamental building blocks of a print server, while the subsystem 106 contains all of the software components necessary to, in conjunction with the Microkernel 104, provide the VCM 16 with a desired level of operability. More particularly, an Agent, which filters out all commands/requests emanating from the Microkernel 104, is designated with the numeral 114. Basically, the Agent serves as a "hook" into the generic ESS to facilitate the handling of all remote requests. The Agent works in conjunction with other services, such as Print Services 116 and Diagnostics 118, to support the operation of the VCM.

The Agent 114 also communicates with an ESS Queue Utility 120 to maintain a composite queue, which composite queue, as will appear, is an important aspect of the preferred embodiment. While the functions of the Agent and the ESS Queue Utility could be combined, they are shown as separate here in a modularized model. The ESS Queue Utility also communicates with a Scan-to-File process 122, which process facilitates the filing of previously scanned documents to the network, as well as an Accounting/Authorization/Authentication service ("AAA") 124. The AAA is used, among other things to authorize the performance of certain acts sought to be performed by a remote client. In one example, the AAA is implemented with software of the type found in Xerox' DocuSP 1.0 print server. As will appear, the AAA facilitates the preferred embodiment in that it prevents the undesirable tampering of one or more queued jobs by unauthorized system users.

Referring to the printing machine 12 aspect of FIG. 7, a Copy Service 128 communicates with the ESS Queue Utility 120 and a VCM Queue Utility 130. The Copy Service, which resides, in one example, on the controller 44 (FIG. 6) performs a function, on the copy side, comparable to the DM 108. Among other things, the Copy Service, supervises the development of copy and Fax jobs as well as the management of the VCM Queue. The VCM Queue Utility communicates with and gathers queue related data from a Mark Service 132 and a suitable User Interface 134. While the functions of the User Interface and the VCM Queue Utility could be combined, they are shown as separate here in a modularized model.

The Mark Service is associated with the printer 20 (FIGS. 2 and 3) and a VCM Queue is associated with the User Interface, as on, for example, the Xerox Document Centre 35 digital copier. As will be appreciated by those skilled in the art, both of the Mark Service and the User Interface are key components in developing and maintaining the VCM Queue. For example, the complexion of the VCM Queue is constantly being altered as a result of activity in the Mark Service, while a significant amount of control is asserted on the VCM Queue as a function of communication with the User Interface.

Figure 8:
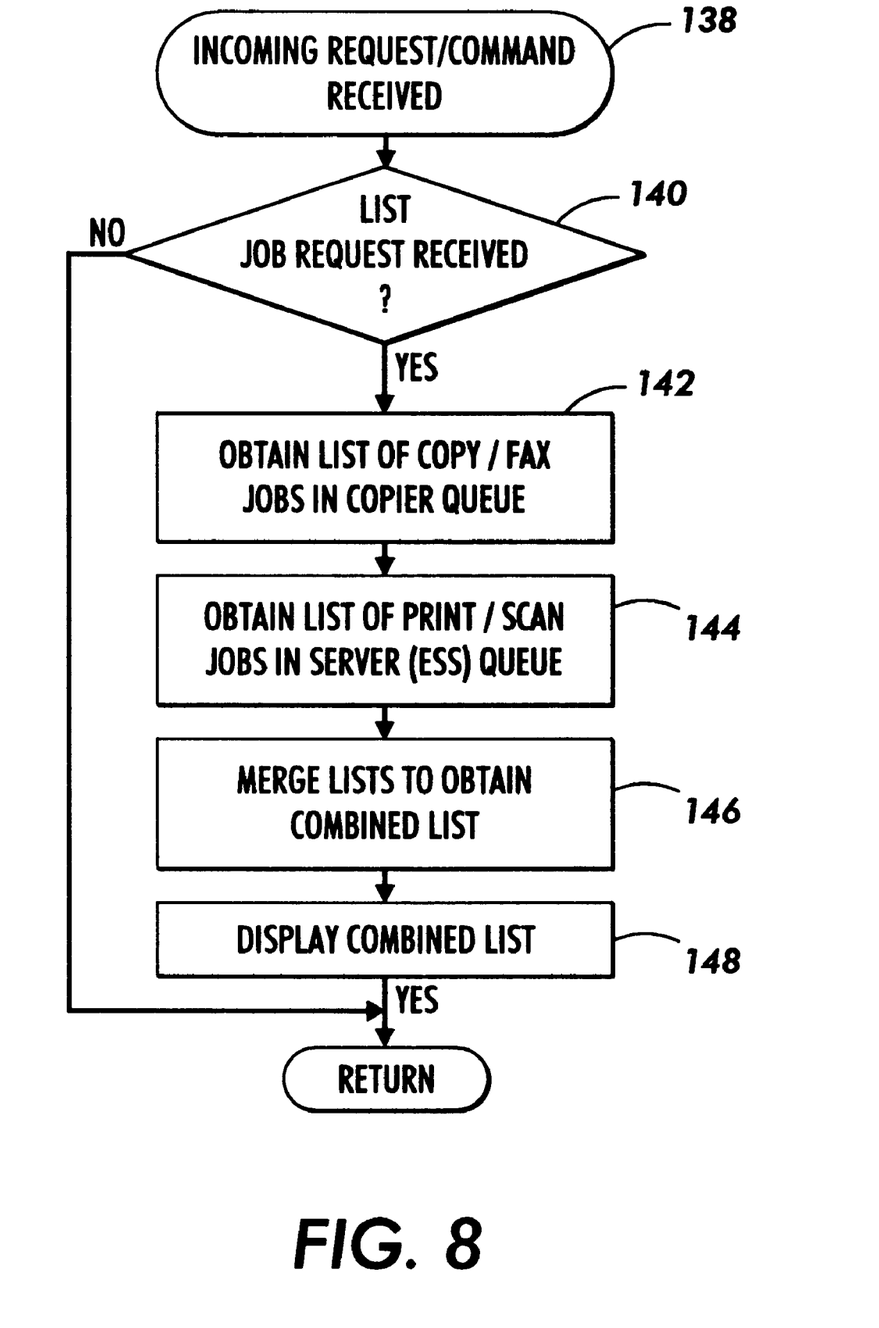
FIG. 8 is a flow diagram illustrating a technique for generating a list representative of a composite queue.

Referring now to FIG. 8, a technique which uses the platform of FIG. 7 to develop a composite print queue for use at one of the clients 100 is described. Before proceeding, a short discussion regarding a need for a composite print queue at the client is provided. Referring specifically to FIG. 7, one known approach of obtaining a queue at one of the remote clients 100 is summarized by reference to flow lines B1, B2 and B3:

B1—A remote request calling for a listing of all jobs on the system is transmitted to the CS 102;

B2—A call is then made by the CS to the DM 108 to get all print, scan and Fax jobs scheduled on the ESS 14; and B3—While the DM returns all queue information about jobs scheduled on the ESS, it does not provide any information regarding copy jobs.

In this one known approach, the remote user may be misled about the size of the system queue, and where his or her job fits in that queue, since the user cannot see the significance of the pending copy jobs on the queue. Moreover, since copy jobs are not shown to the remote user, queue operation can only be performed with respect to jobs scheduled on the ESS.

Referring still to FIGS. 7 and 8, to obtain a composite or system queue for remote use, a "ListJob" request is provided by one of the clients 100 to the CS 102 (See flow line designated as "B1"). When a ListJob command is received by the CS (See steps 138 and 140), a list of jobs residing at the printing machine or digital copier 12 can be obtained (step 142) by way of flow lines "G1", "G2", "G3" and "G4". That is, the CS sends a request to the Agent 114 (G1), which Agent, in turn, requests that a list of all jobs at the printing machine be forwarded to the ESS Queue Utility 120 (G2). The ESS Queue Utility 120 then requests that the Copy Service 128 get a list of the currently pending copy jobs (G3). In response to the request from the ESS Queue Utility, all information regarding the currently pending copy jobs are provided from the Copy Service to the ESS Queue Utility (G4).

Referring to step 144 as well as flow lines "G6", "G7" and "G8", a list of jobs on the ESS is obtained with the ESS Queue Utility. More particularly, the DM 108 returns information regarding jobs on the ESS to the ESS Queue Utility (G6) and, in turn, the ESS Queue Utility merges all jobs (step 146) into one list and returns the same to the Agent 114 (G7) for communication of the list (via G8) to the CS 102. The CS 102 then, at step 148, causes a representation of the merged queue to be displayed remotely at one of the clients 100.

Figure 9:
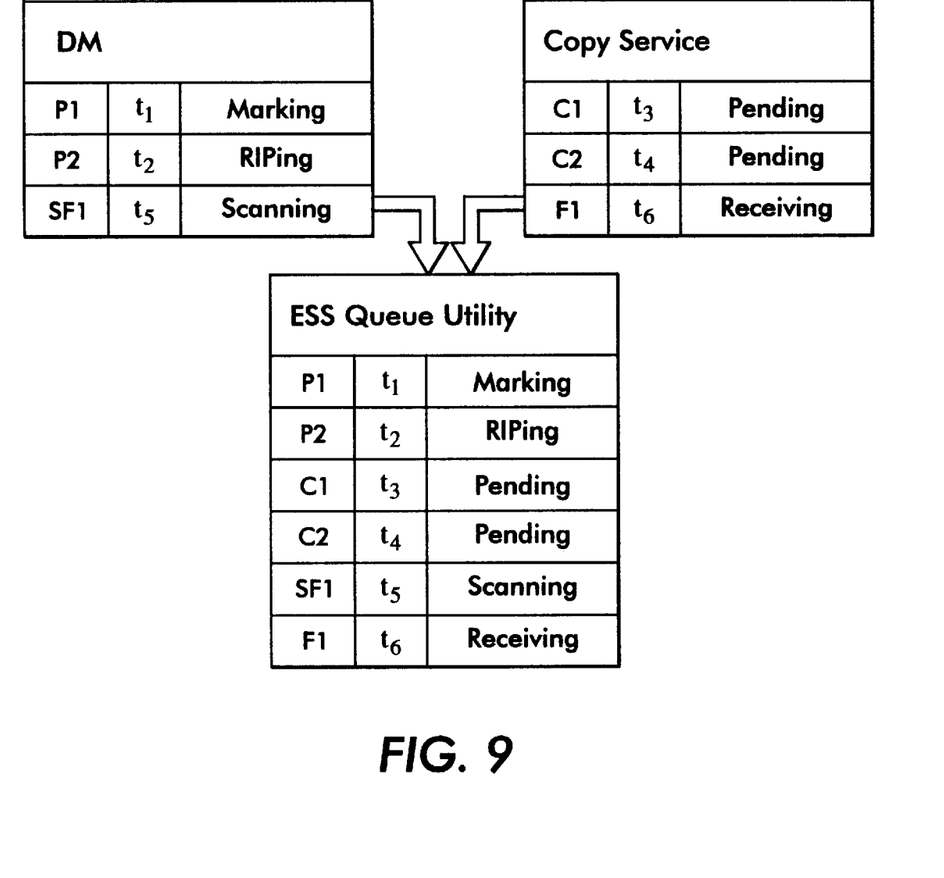
FIG. 9 is a schematic diagram illustrating a merge step for the list generating aspect of the technique of FIG. 8.

Referring to FIG. 9, it will be understood that the merging operation of step 146 can be implemented through a conventional sorting operation with the sorting being based on one of a number of suitable criterion. In the example of FIG. 9, the sorting is based on the time at which a given job is introduced to the printing system 10, i.e. based on it. Another exemplary criterion would include sorting according to job type. In this example, a job would be assigned a higher or lower priority depending on whether the job is a copy job, a local or network Fax job, a scan job or a print job. In the priority based system, a criterion other than job type priority would be required to break ties between two jobs of the same type. For instance, a copy job received by the printing system at one time would be given priority over a copy job received by the printing system at a later time.

Figure 10:
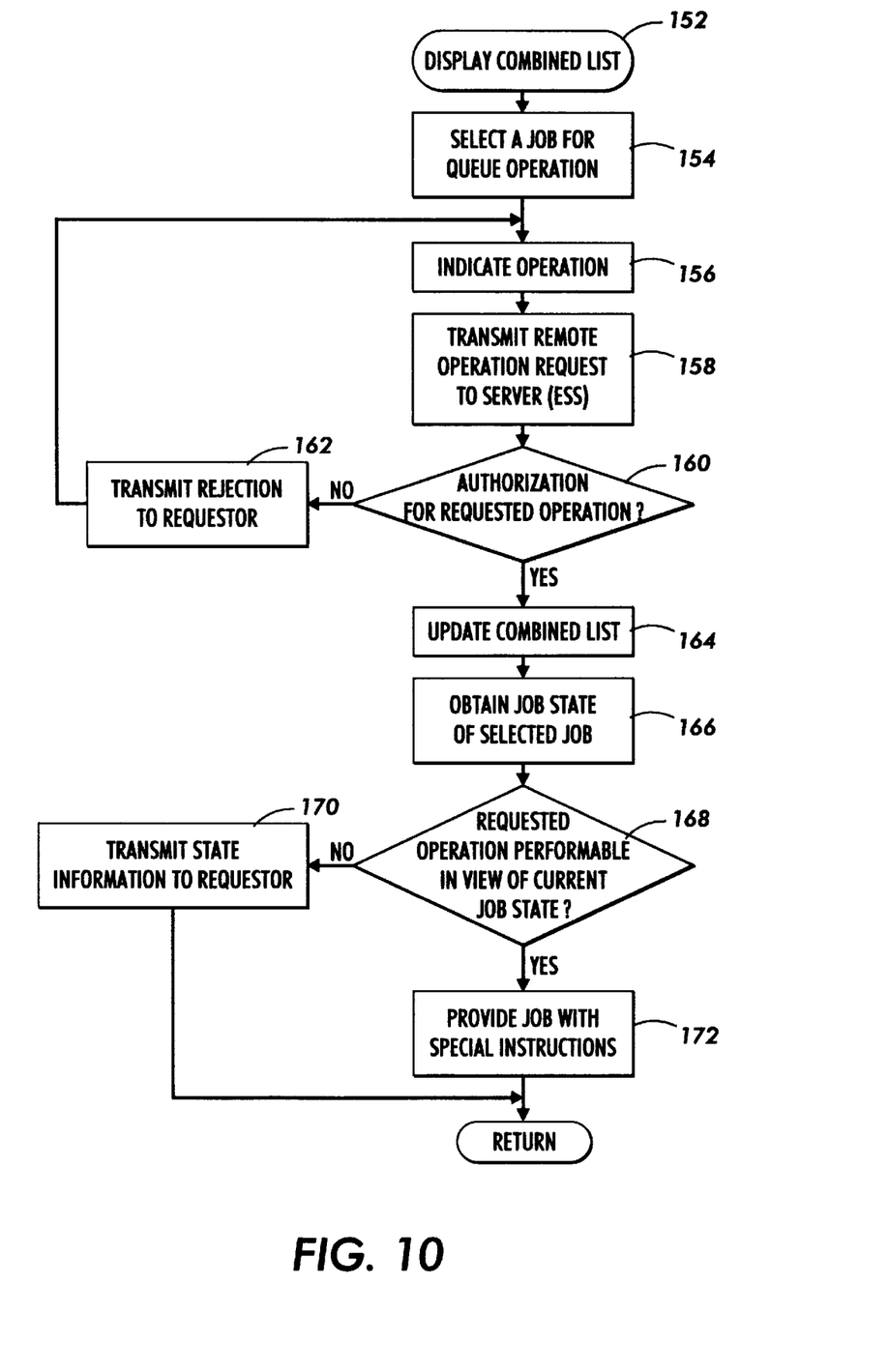
FIG. 10 is a flow diagram illustrating a technique for using the composite queue formed with the technique of FIG. 8.

Referring now to FIG. 10, a technique for using the list to perform queue operations is discussed. The term "queue operation" as used herein refers to any operation that either changes the position of a job in a queue or affects the rate at which the job moves up in the queue. As will be appreciated, this definition is broad enough to cover, among other operations: interrupt, proof, hold (with release) and cancel. In practice, an interrupt or proof operation is accomplished by queue manipulation of the type found in Xerox DocuTech printing machine, an example of which queue manipulation can be found in U.S. Pat. No. 5,164,842 to Gauronski et al. Additionally, a hold and release operation can be performed in accordance with a system of the type disclosed in U.S. Pat. No. 4,843,571, the disclosure of which is incorporated herein by reference. Finally, job deletion or cancellation is a conventional operation which is currently available to the public in a wide variety of software applications.

Referring to FIGS. 7 and 10, a combined list, of the type shown in FIG. 9 is displayed (step 152) on a client user interface (not shown)—a display suitable for use in queue manipulation is illustrated in FIG. 13 of U.S. Pat. No. 5,164,842. With the displayed list, a job is selected (step 154), using any conventional pointing arrangement (supported by suitable control functionality of the type disclosed above) and an operation is indicated (step 156). Information regarding selection and operation indication is then transmitted to the DM 108 (step 160), by way of the CS 102, for use in modifying the list at the ESS Queue Utility 120. Prior to providing the instructions to the Copy Service 128 for execution, however, the Utility seeks an appropriate authorization (step 160) from the AAA 124.

More particularly, along with the instructions, the user commonly provides the CS with information regarding the user's identity and the job(s) upon which the user desires to perform a queue operation. By reference to this information, the AAA is readily able to determine if authority exists for performing the operation indicated by step 156. In one example, the AAA includes a look-up table in which user rights are mapped against jobs pending in the system—part or all of the information communicated to the AAA can be used as an index into the look-up table. If it is determined, via step 162, that authorization does not exist for the indicated operation, a rejection is communicated back to the user.

Assuming that the user obtains an authorization to have the indicated queue operation performed, the system queue or list is updated, at step 164, by the ESS Queue Utility 120. This update is achievable because the DM 108 and Copy Service 128 maintain state information with respect to the jobs currently residing within the printing system and that information is made available to the developer of the system list or composite queue, namely the ESS Queue Utility. As will be appreciated, an update may reflect one of several things. In one instance, an update may reflect that a queue has expanded or contracted in size. In another instance, an update may reflect that the state of one or more jobs has changed.

With state information in hand, the ESS Queue Utility, at step 166, obtains job state information for the selected job. In view of the most current state information, a determination as to whether the indicated operation can be executed is made at step 168. As will be appreciated, there may be several reasons for not being able to carry out an indicated queue operation. In one example, the job may not be ready for queue manipulation because of the state in which it currently resides. For instance, a job may be designated for an interrupt when it still requires further job processing, e.g. decomposing. In another example, queue manipulation may not be possible because the job is no longer in an operable state, e.g. the job has already been marked.

If the job cannot be manipulated, due to its current state, then an appropriate message, via step 170, is provided to the owner of the selected job; otherwise, a set of special instructions is generated, at step 172, for performing the indicated operation. It should be appreciated that the set of special instructions can be developed at one of a variety of locations. That is, they could be created upstream of the ESS Queue Utility 120 with, for example, a suitable client print driver, or at the ESS Queue Utility itself. In any event, some form of input regarding the nature of the queue operation to be performed is preferably provided by the requesting client.

Figure 11:
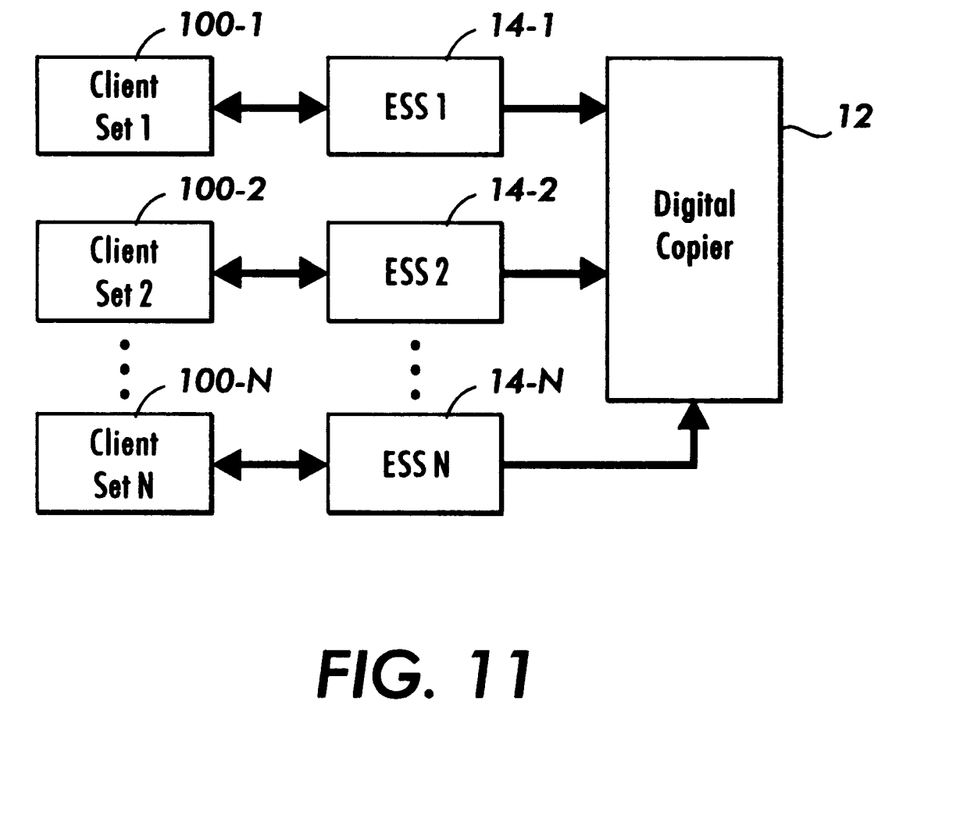
FIG. 11 is a block diagram illustrating a printing system with a plurality of electronic subsystems.

Referring to FIG. 11, it should be appreciated by those skilled in the art that the printing system of FIG. 6 can be provided with a plurality network service modules (also referred to as electronic subsystems (ESSs)). In such an arrangement separate client sets can be provided with a wide range of functionality. That is, one ESS (e.g. ESS1) could be used to provide a functionality suitable for users with "print shop" type jobs (See U.S. Pat. No. 5,493,634 for an example of an ESS suitable for processing print shop type jobs) while another ESS (e.g. ESS2) could be used to provide functionality to users with "desk-top" type jobs" (See U.S. Pat. No. 5,136,688 for an example of an ESS suitable for processing desk-top type jobs). It will be recognized that a significant number of ESSs could be provided to accomodate for various user needs, as suggested by such references as U.S. Pat. Nos. 5,243,518 and 5,371,837). Each of the disclosures of the patents cited in this paragraph is incorporated herein by reference.

Referring still to FIG. 11, application of the technique taught by the flow diagram of FIG. 8 to the illustrated embodiment of FIG. 11 can be understood. In one example, ESS1 has the same structure as the network module 14 (FIG. 7) and queue information for each of ESS2–ESSN is maintained at a centralized location, such as the printing machine 12 (FIG. 2). Accordingly, when a client of the Client Set 1 seeks information regarding a system queue, the ESS Queue Utility 120 of ESS1 can, with the functionality disclosed by FIG. 8, obtain all pertinent queue information residing at the centralized location. The obtained information is then combined, in a manner comparable to that taught by FIGS. 8 and 9. More particularly, queue information regarding jobs at both ESS2–ESSN and the printing machine 12 are sorted suitably with the queue information of ESS1 for transmission of a resulting composite queue to the Client Set 1 for display thereat.

Numerous features of the above-described preferred embodiment will be appreciated by those skilled in the art:

First, a technique which permits a client to obtain a full range of information regarding an order of intended job execution in a printing system is provided. In particular, when the client requests information regarding a job queue, information reflecting order of printing for both jobs developed at the print server and jobs developed at the copier is provided in the form of a composite queue. In this way, the client fully appreciates the impact of copy and local Fax jobs on his/her ability to access the copier print engine in a timely manner, rather than just the impact of ESS jobs on such ability.

Second, development of the composite queue for the client permits the client to perform a queue operation on a job which, in a number of instances, would not be possible with a queue that simply reflects the jobs on the ESS. In particular, under certain circumstances a job simply cannot be promoted to the top of a print queue unless those accessing the system are aware of all the jobs in the queue and not just some of them.

Third, the subject technique insures that the client is making queue manipulation decisions based on current information. More particularly, prior to providing queue operation instructions to the copier, an indicated queue operation is checked to determine whether it can still be performed. In this way, an indicated queue operation is not performed unless the subject job is still in an appropriate state.

Fourth, while the subject technique provides the user with greater capability, in that queue operations can be performed with respect to jobs developed at the copier, the subject technique insures that that client will not be able to abuse the power to perform a queue operation. That is, the client, in one aspect of the preferred embodiment, will only be permitted to perform one or more indicated operations that are preauthorized by an authorization service.

Finally, the subject technique is applicable with a system including a plurality of electronic subsystems (ESSs) in which the order of printing for a given client may be impacted by various ESS queues to which the client does not even have access. In accordance with an aspect of the subject technique, the queue displayed to the given client will reflect a composite queue that accomodates for the queue activities occuring at a digital copier as well as each of the plurality of ESSs.

What is claimed is:

1. A printing system with a digital reproduction system having a print engine, the digital reproduction system communicating with a remote document processing station by way of a print server, comprising:
   (a) a first queue of first jobs to be executed with the digital reproduction system, the first queue being maintained at the print server and the first jobs being maintained in a first order;
   (b) a second queue of second jobs to be executed with the digital reproduction system maintained at the digital reproduction system, wherein the second jobs are maintained in a second order;
   (c) a queue process communicating with both said first and second queues, said queue process forming a composite queue view to reflect an order in which the first and second jobs of the first queue and the second queues are to be executed with the digital reproduction system by,
      (i) initiating development of said composite queue view in response to a request signal, said request signal being generated on the basis of input from the remote document processing station,
      (ii) automatically, electronically obtaining a first set of information reflecting the first order of the first jobs in the first queue and a second set of information reflecting the second order of the second jobs in the second queue, and
      (iii) merging the first set of information with the second set of information in accordance with a selected criterion for providing the composite queue view, wherein neither of the first order of the first jobs nor the second order of the second jobs is altered as a result of said merging; and
   (d) a user interface disposed at the remote document processing station, said user interface receiving a representation of said composite queue view for display thereof.

2. The printing system of claim 1, in which each of the jobs in the first and second queues are corresponded with a time indicium, wherein said merging of the first and second sets of information includes sorting the jobs shown in the composite queue view as a function of their respective time indicia.

3. The printing system of claim 1, in which each of the jobs in the first and second queues is assigned a priority based, at least in part, on job type, wherein said merging of the first and second sets of information includes sorting the jobs shown in the composite queue view as a function of their respective priorities.

4. The printing system of claim 1, in which the printing system includes a second print server communicating with the digital reproduction system, further comprising:
   (e) a third queue for third jobs to be executed with the digital reproduction system, the third queue being maintained at the second print server; and
   wherein,
      said queue process is apprised of the contents of said third queue and forms the composite queue view to reflect an order in which the first, second and third jobs of the first, second and third queues are to be executed with the digital reproduction system,
      said (c)(ii) further includes automatically, electronically obtaining a third set of information reflecting an order of the third jobs in the third queue, and
      said (c)(iii) further includes merging the first, second and third sets of information in accordance with the selected criterion for providing the composite queue view.

5. A printing system with a digital reproduction system having a print engine, the digital reproduction system communicating with a remote document processing station by way of a print server, comprising:
   (a) a first queue of first jobs to be executed with the digital reproduction system maintained at the print server, wherein the first jobs are maintained in a first order;
   (b) a second queue of second jobs to be executed with the digital reproduction system maintained at the digital reproduction system, wherein the second jobs are maintained in a second order;
   (c) a queue process communicating with both said first and second queues, said queue process forming a composite queue view to reflect an order in which the jobs of both the first queue and the second queue are to be executed with the digital reproduction system, wherein neither of the first order of the first jobs nor the second order of the second jobs is altered as a result of said forming;
   (d) a user interface, disposed at the remote document processing station, for (i) selecting one of the jobs in the composite queue view, and (ii) designating a queue operation to be performed on said selected job; and
   (e) a queue operation subsystem for performing said queue operation on said selected job in response to both input from said user interface and a selected condition being met.

6. The printing system of claim 5, wherein said queue operation is performed in response to receiving an authorization signal, at said queue process, indicating that the performing of said queue operation is permissible.

7. The printing system of claim 5, wherein said queue operation is performed when said selected job still exists in a state upon which the queue operation can be performed.

8. The printing system of claim 5, wherein the composite queue view is updated in response to a change in a number of jobs in either the first queue or the second queue.

9. The printing system of claim 5, wherein the composite queue view is updated in response to a change in state of one of the jobs in either the first queue or the second queue.

10. The printing system of claim 5, wherein said queue operation subsystem causes a job in one of the first and second queues to be moved relative to one or more other jobs in the one of the first and second queues.

11. The printing system of claim 5, wherein said queue operation subsystem prohibits advancement of a job in one of the of the first and second queues until a second selected condition is met.

12. In a printing system with a digital reproduction system having a print engine, the digital reproduction system communicating with a remote document processing station by way of a print server, a first queue of first jobs to be executed with the digital reproduction system maintained at the print server in a first order and a second queue of second jobs to be executed with the digital reproduction system maintained at the digital reproduction system in a second order, an improvement comprising:
   (a) forming a composite queue view to reflect an order in which the jobs of both the first queue and the second queue are to be executed with the digital reproduction system by,
      (i) initiating development of said composite queue view in response to a request signal generated on the basis of input from the remote document processing station,
      (ii) automatically, electronically obtaining a first set of information reflecting the first order of the first jobs in the first queue and a second set of information reflecting the second order of the second jobs in the second queue, and (iii) merging the first set of information with the second set of information in accordance with a selected criterion for providing the composite queue, wherein neither of the first order of the first jobs nor the second order of the second jobs is altered as a result of said merging; and (b) displaying said composite queue with a user interface disposed at the remote document processing station.

13. The improvement of claim 12, in which (a)(i), (a)(ii) and (a)(iii) are performed with a utility communicating with both the document processing station and the digital reproduction system.

14. The improvement of claim 12, in which each of the jobs in the first and second queues are corresponded with a time indicium, wherein said (a)(iii) includes sorting the jobs shown in the composite queue view as a function of their respective time indicia.

15. The improvement of claim 12, in which each job is assigned a priority based on job type, wherein said (a)(iii) includes sorting the jobs shown in the composite queue view as a function of their respective priorities.

16. The improvement of claim 12, further comprising updating the composite queue in response to a change in a number of jobs in either the first queue or the second queue view.

17. The improvement of claim 12, further comprising updating the composite queue view in response to a change in state of one of the jobs in either the first queue or the second queue.

18. In a printing system with a digital reproduction system having a print engine, the digital reproduction system communicating with a remote document processing station by way of a print server, a first queue of first jobs to be executed with the digital reproduction system maintained at the print server and a second queue of second jobs to be executed with the digital reproduction system maintained at the digital reproduction system, an improvement comprising:

(a) providing, the remote document processing, a composite queue view reflecting an order in which the jobs of both the first queue and the second queue are to be executed with the digital reproduction system;

(b) selecting, with a user interface disposed at the remote document processing station, one of the jobs in the composite queue;

(c) designating, with the user interface, a queue operation to be performed on said selected job; and performing said queue operation on said selected job in response to receiving an authorization signal indicating that said performing is permissible.

19. The improvement of claim 18, further comprising generating a set of instructions at one or both of the remote document processing station and the print server, said (d) being executed in response to the set of instructions being communicated to the digital reproduction system.

20. The improvement of claim 18, where said (d) includes performing said queue operation when said selected job still exists in a state suitable for said performing.

21. The improvement of claim 18, wherein said (d) includes performing said queue operation in response to receiving an authorization signal indicating that said performing is permissible.

22. The improvement of claim 18, wherein said (d) includes promoting said selected job relative to one or more first or second jobs.

23. The improvement of claim 18, wherein said (d) includes prohibiting advancement of said selected job relative to one or more first or second jobs.

24. The improvement of claim 23, further comprising permitting the job to advance in its respective queue in response to receiving a release signal.

25. The improvement of claim 18, wherein said (d) includes canceling said selected job.

26. The improvement of claim 18, further comprising updating the composite queue in response to a change in a number of jobs in either the first queue or the second queue.

27. The improvement of claim 18, further comprising updating the composite queue in response to a change in state of one of the jobs in either the first queue or the second queue.

* * * * *